United States Patent [19]

Nimura

[11] 4,404,487

[45] Sep. 13, 1983

[54] BRUSH HOLDING DEVICE FOR ALTERNATORS

[75] Inventor: Takayasu Nimura, Nagoya, Japan

[73] Assignee: Nippondenso Co., Ltd., Kariya, Japan

[21] Appl. No.: 326,655

[22] Filed: Dec. 2, 1981

[30] Foreign Application Priority Data

Dec. 26, 1980 [JP] Japan ................................ 55-185262

[51] Int. Cl.[3] ............................................ H02K 13/00

[52] U.S. Cl. ..................................... 310/239; 310/242

[58] Field of Search ............... 310/232, 238, 239, 240, 310/242, 245, 246, 247, 43

[56] References Cited

U.S. PATENT DOCUMENTS

| | | | |
|---|---|---|---|
| 3,141,985 | 7/1964 | Martin | 310/239 |
| 3,267,312 | 8/1966 | Redick et al. | 310/239 |
| 3,628,075 | 12/1971 | Dafler et al. | 310/239 |
| 4,075,523 | 2/1978 | Lafferty | 310/239 |

*Primary Examiner*—R. Skudy

*Attorney, Agent, or Firm*—Cushman, Darby & Cushman

[57] ABSTRACT

A brush holding device for holding carbon brushes in sliding contact with slip rings of an alternator. The device has a brush holder formed by an insertion molding integrally with terminal plates. The brush holder has a pair of brush chambers for movably receiving the carbon brushes and a pair of pig tail chambers accommodating pig tails through which the carbon brushes are electrically connected to the terminal plates. The carbon brushes are resiliently biased into contact with the slip rings by means of coiled springs acting between the radially outer ends of the carbon brushes and the radially outer walls of the brush receiving chambers. The pig tails are extended into adjacent brush chambers through slits formed in the walls separating the pig tail chambers from associated brush chambers and are connected to the carbon brushes at lateral sides of the latter.

9 Claims, 3 Drawing Figures

BRUSH HOLDING DEVICE FOR ALTERNATORS

BACKGROUND OF THE INVENTION

The present invention relates to a brush holding device for holding brushes in contact with slip rings of an alternator for use in a vehicle.

Alternators are commonly used as electric power sources of vehicles such as automobiles and so forth. As will be described later in detail with reference to the drawings, the conventional alternators involved various problems. For instance, a pig tail electrically connecting the brush to a terminal plate tends to be caught and pinched between adjacent turns of the coiled spring, which surrounds the pig tail and presses the brush against the slip ring, due to vibration of the vehicle on which the alternator is mounted and often results in a cutting of the pig tail. The pig tail is usually stranded from element wires of copper. Therefore, as the pig tail is soldered at its one end to the terminal plate, the molten solder penetrates into the pig tail toward the brush due to wick or capillary action of the pig tail. The solidified solder deteriorates the flexibility of the pig tail which reduces to smoothness of the radial movement of the brush. In addition, in order to obtain a sufficiently high rigidity and stability of the mechanical and electrical connection between the brush and the pig tail, the effective length of the brush is inevitably shortened uneconomically.

SUMMARY OF THE INVENTION

Accordingly, an object of the invention is to provide an improved brush holding device capable of eliminating the above-described problems of the prior art.

To this end, according to the invention, there is provided a brush holding device for alternators, having a holder formed integrally from an electrically insulating material to have a pair of brush chambers slidably receiving carbon brushes, pig tails electrically connected to the carbon brushes and coiled springs by which the carbon brushes are pressed against the slip rings of the alternator, wherein the improvement comprises a pair of pig tail chambers for receiving the pig tails and a slit formed in the wall separating each pig tail chamber from the adjacent brush chamber, the pig tail being extended through the slit and connected to the associated carbon brush at a lateral side of the latter.

The above and other objects, as well as advantageous features of the invention, will become clear from the following description of the preferred embodiment taken in conjunction with the accompanying drawings.

DESCRIPTION OF THE PREFERRED EMBODIMENT

By way of background, a description will be made as to the conventional brush holding device in order to facilitate the understanding of the drawbacks of the prior art and, hence, the advantages brought about by the present invention.

Figure 1:
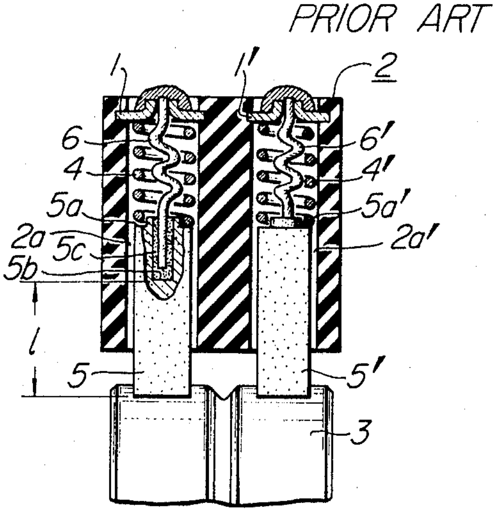
FIG. 1 PRIOR ART
FIG. 1 is a vertical sectional view of a conventional brush holding device.

FIG. 1 shows a typical brush holding device having a brush holder 2 formed of an electrically insulating material by an insertion molding to have a pair of terminal plates 1,1'. The brush holder 2 has a pair of brush chambers 2*a*, 2*a'* opened at only the one of their ends which faces slip rings 3 of an alternator (not shown) and slidably receiving carbon brushes 5,5' for contact with the slip rings 3. More specifically, the carbon brushes 5,5' are pressed against the slip rings 3 by means of coiled springs 4,4' acting between the plate terminals 1,1' and the end surfaces 5*a*,5*a'* of the carbon brushes. The carbon brushes 5,5' are connected to corresponding terminal plates 1,1' by means of pig tails 6,6' stranded from copper element wires and extending through respective coiled springs 4,4' along the axes of the latter. The pig tails 6,6' are electrically connected at one of their ends to the plate terminals 1,1' by soldering while the other ends are inserted into radial bores 5*b* formed in the end surfaces 5*a*,5*a'* of respective carbon brushes 5,5' and fixed in these bores by means of carbon powders 5*c* to provide a mechanical and electric connection.

This conventional brush holding device suffers various problems as stated below.

(1) Since the brush has a substantial length in the radial direction of the slip ring, most of the brush inside is received by the brush chamber when it is mounted in contact with the slip ring, while compressing the coiled spring. In this state, the pig tail is slackened as illustrated, so that it is often caught and pinched between adjacent turns of the coiled spring due to the vibration of the vehicle on which the alternator is mounted, resulting in a frequent cutting of the pig tail.

(2) Since the pig tail is stranded from a multiplicity of stranded copper element wires, molten solder is inconveniently sucked and flowed along the pig tail toward the carbon brush due to the wick or capillary action of the pig tail, when the pig tail is soldered to the terminal plate. The solder then solidifies and deteriorates the flexibility of the brush which reduces the smooth radial movement of the carbon brush in the brush holder. In the worst case, the carbon brush cannot be fitted in the brush chamber at all due to the rigidity of the pig tail which essentially has to be flexible enough to allow smooth radial movement of the brush.

(3) The openings of the brush chambers are formed only in one side of the brush holder facing the slip ring, in order to enhance the water-proof nature of the device and this is the reason why the pig tails are inserted into the coiled springs. This in turn requires the fixing of the pig tail to the brush only in the radial direction of the slip ring. In consequence the brush fixing bore has a substantial radial length which to uneconomically shortens the effective length L of the carbon brush in order to achieve a sufficiently high rigidity of the mechanical and electrical connection between the pig tail and the carbon brush.

These problems, however, are completely overcome by the brush holding device of the invention, as will be understood from the following description of the preferred embodiment.

Figure 2:
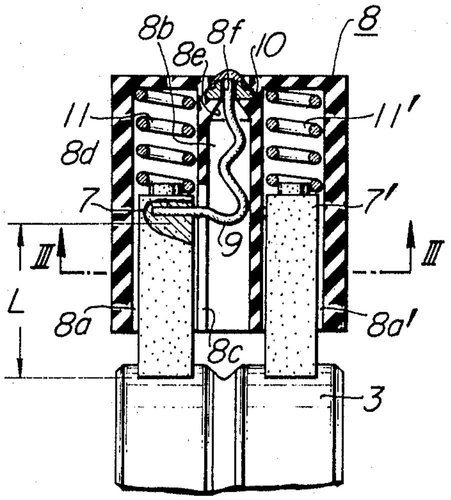
FIG. 2 is a sectional view of a part of a brush holding device of the invention taken along the line II—II of FIG. 3.
Figure 3:
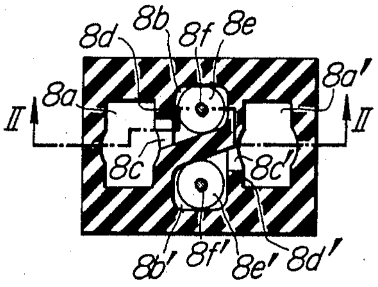
FIG. 3 is a sectional view taken along the line III—III of FIG. 2.

In FIGS. 2 and 3, showing a brush holding device constructed in accordance with an embodiment of the invention, a pair of carbon brushes 7,7' are held in electric insulation from each other within a brush holder 8 formed of an electrically insulating material. The brush holder 8 has a pair of chambers 8*a*,8*a'* (referred to as a first chamber and a second chamber, respectively, hereinunder) opened at one of their sides and receiving the carbon brushes 7,7'. The brush holder 8 further has a pair of chambers **8*b*,8*b'* (referred to as a third chamber and a fourth chamber, respectively, hereinunder) opened also at one of their ends and accomodating a corresponding one of a pair of pig tails 9 one of which is not shown in the drawings. The third and fourth chambers 8*b*,8*b'* are interposed between the first and second chambers 8*a*,8'. More specifically, the first and third chambers 8*a*,8*b* are separated from each other by a wall 8*d*, while the second and fourth chambers 8*a'*,8*b'* are separated from each other by means of a wall 8*d'*. These walls 8*d*,8*d'* are provided with slits 8*c*,8*c'* of a width large enough to permit the pig tails 9 to pass laterally therethrough and are formed in symmetry with each other. In order to facilitate the insertion of the pig tails 9, conical recesses 8*e*,8*e'* are formed in the closed ends of the third and fourth chambers 8*b*,8*b'*. Through-bores 8*f*,8*f'* sized to be just passed by the pig tail are formed in the bottom of the conical recesses 8*e*,8*e'*. A pair of terminal plates 10,10', having holes of a diameter substantially equal to that of the through-bores 8*f*,8*f'*, are integrated with the brush holder 8 by an insertion molding and extended to the outside of the latter for electric connection to other parts which are not shown. The pig tails 9 stranded from copper element wires are accomodated by the third and fourth chambers 8*b*,8*b'* with a certain slack, and are soldered at their upper ends to the terminal plates 10, while the other ends are extended through the slits 8*c*,8*c'* and lead into the carbon brushes 7,7' from the lateral sides of the latter. The pig tails 9 are integrated with the carbon brushes by an insertion molding when the brushes are formed by means of molds, so that a highly rigid mechanical and electric connection is achieved between each pig tail 9 and the associated carbon brush. The carbon brushes 7,7' are received somewhat loosely by the first and second chambers 8*a*,8*a'* so that they may be moved smoothly in these chambers in the radial direction of the slip ring. The carbon brushes 7,7' are urged by coiled springs 11,11 acting on their ends opposite to the slip rings 3, so that their ends appearing from the openings of the chambers are held in resilient sliding contact with the slip rings 3. The coiled springs 11,11' are suitably preloaded to ensure a moderate contact pressure between the carbon brushes 7,7' and the slip rings 3 even when the carbon brushes 7,7'** are worn to reduce their effective length L.

In operation of the alternator, the exciting current supplied from an external source to the terminal plate 10 is delivered to the carbon brush 7 through the pig tail 9 and then to a rotor field (not shown) which is known per se via the slip ring 3 which is held in sliding contact with the brush 7. The exciting current then flows to the outside of the alternator through the other slip ring 11', brush 7', pig tail and terminal plate. Thus, the terminal plates, pig tails, brushes, slip rings and the rotor field constitute a closed exciting circuit in combination with the external exciting current source. This circuit itself is well known so that no further explanation of this circuit will be needed here.

The brush holding device of the invention offers the following advantages. The brushes 7,7' are received by the first and second chambers **8*a*,8*a'* in such a manner as to be able to slide smoothly toward the center of the slip rings. Therefore, these brushes are held in sliding contact with the slip rings 3 at suitable range of contact pressure provided by the coiled springs 11,11' from the beginning of the use till the end of use at which the effective length L of the brushes is completely worn and consumed away. In consequence, the carbon brushes 7,7' are stably held in respective chambers 8*a*,8*a'*** without any rattle or jolt while making good sliding contact with the slip rings.

The pig tails 9 are extended from lateral sides of respective brushes 7,7' and are extended through the slits **8*c*,8*c'* into the third and fourth chambers 8*b*,8*b'*. Thus, the major part of each pig tail 9 is accomodated by each chamber 8*b* or 8*b'* with a certain slack. Therefore, when the effective length L of the carbon brushes have been worn away, the spring have straightened and stretched the pig tails 9 which nevertheless restrain the carbon brushes to prevent the direct contact of pig tails with the slip rings, thereby avoiding damage to the slip rings which may, otherwise, be caused by direct contact between the pig tail and the slip rings. Since the pig tails 9 are accomodated by the third and fourth chambers 8*b*,8*b'*, the slack portions of the pig tails do not jam between the adjacent turns of the coiled springs 11,11' and are allowed to flex freely. In addition, since the slits 8*c*,8*c'* through which the pig tails 9 are lead into the first and second chambers 8*a*,8*a'* are sized to be slightly greater than the pig tails 9, the slack portions of the pig tails 9 do not come into the first and second chambers 8*a*,8*a'*. Since the pig tails 9 are accomodated in independent chambers 8*b*,8*b'* separately from each other, the smooth sliding of the carbon brushes in the first and second chambers is never reduced even when the solder penetrates into the pig tails. The electric connection between the pig tail 9 and the associated terminal plate 10 is achieved by inserting the end of the pig tail 9 to the hole in the terminal plate 10 and soldering the inserted end to the terminal plate. The insertion of the pig tail is facilitated because the inner ends, i.e. the radially outer ends, of the third and fourth chambers 8*b*,8*b'*** are recessed in a conical form.

In the described embodiment, the pig tail is integrated with the associated carbon brush by an insertion molding for forming the latter. This, however, is not exclusive and the problems such as cutting of the pig tail, reduced smoothness of movement of the carbon brush in the holder and so forth are overcome even if the pig tail is fixed to the carbon brush by means of copper powders as in the conventional brush holding device.

It is also to be understood that, while in the described embodiment the third and fourth chambers are positioned between the first and second chambers, the third and fourth chambers may be formed at both sides of the first and second chambers. These chambers may be formed in a random manner.

As has been described, in the brush holding device of the invention, the pig tails are accomodated by independent chambers separately from the carbon brushes, so that the pig tails are never caught nor pinched between the adjacent turns of the coiled springs even when they are slackened, thereby to eliminate troubles such as accidental cutting of the pig tail. It is also to be noted that the smooth movement of the carbon brush in the brush holder is never reduced even when the solder comes to penetrate into the pig tail due to an inferior soldering. In consequence, the number of steps of the production process is remarkably reduced and the rate of production of unacceptable goods is also reduced advantageously. Furthermore, since the pig tails are integrated with the carbon brushes at lateral sides of the latter the effective length L of the carbon brushes is economically increased because it is possible to make use of the whole radial height of the carbon brush. This conveniently elongates the life of the carbon brushes and, hence, contributes greatly to the saving of natural resources.

Although the invention has been described through specific terms, it is to be noted here that the described embodiments are only for illustrative purpose and various changes and modifications may be imparted thereto without departing from the spirit and scope of the invention which is limited solely by the appended claims.

What is claimed is:

1. A brush holding device for holding brushes in sliding contact with slip rings of an alternator, comprising:

a brush holder formed in one body from an electrically insulating material to include a pair of brush chambers open at one of their ends to face said slip rings;

a pair of brushes movably received in said brush chambers respectively;

coiled springs disposed in said chambers respectively for urging one end of said brushes into resilient sliding contact with said slip rings;

a pair of terminal plates fixed to said brush holder; and pig tails electrically connecting said brushes and said terminal plates respectively, said brush holder having a pair of pig tail chambers respectively adjacent said brush chambers and further having a pair of walls separating said pig tail chambers from said brush chambers respectively, said terminal plates being in said pig tail chambers respectively, there being a slit in each of said separating walls adjacent the other end of the respective brush, said pig tails being accomodated by said pig tail chambers and extending from said terminal plates through said slits respectively into adjacent brush chambers and being connected to respective sides of said brushes.

2. A brush holding device as claimed in claim 1, wherein said pig tail chambers are disposed between said brush chambers.

3. A brush holding device as claimed in claim 1, wherein said pig tail chambers are disposed at both sides of said brush chambers.

4. A brush holding device as claimed in claim 1, wherein said pig tails are insertion molded into said brushes.

5. A brush holding device as claimed in claim 1, wherein said pig tails are fixed to said brushes by means of copper powders.

6. A brush holding device as claimed in claim 1, wherein said pig tail chambers are provided at their ends opposite to said slip rings with conical recesses and holes formed at the bottoms of said conical recesses, said pig tails being extended through said holes into connection with said terminal plates.

7. A brush holding device as in claim 1 wherein said pig tails extend internally in the respective brushes substantially perpendicularly to the said side thereof at said other end.

8. In a brush holding device for holding at least one brush in sliding contact with a slip ring of an alternator, comprising:

a brush holder formed in one body from an electrically insulating material to have a brush chamber open at one of its ends to face said slip ring, a brush reciprocally received in said brush chamber, a coiled spring disposed in said chamber for urging one end of said brush into resilient sliding contact with said slip ring, a terminal plate fixed to said brush holder, and a pig tail electrically connecting said brush and said terminal plate, said brush holder having a pig tail chamber adjacent said brush chamber and further having a wall separating said pig tail chamber from said brush chamber, said terminal plate being in said pig tail chamber, there being a slit in said separating wall adjacent a second end of said brush which is opposite to said one end, said pig tail being accomodated by said pig tail chamber and extending from said terminal plate through said slit into said adjacent brush chamber and being connected to a side of said brush at said second end thereof.

9. A brush holding device as in claim 8 wherein said pig tail extends internally in said brush at said second end thereof in a direction substanitally perpendicular to the said side thereof.

* * * * *